(12) United States Patent
Varshneya

(10) Patent No.: US 8,304,078 B2
(45) Date of Patent: Nov. 6, 2012

(54) CHEMICALLY STRENGTHENED LITHIUM ALUMINOSILICATE GLASS HAVING HIGH STRENGTH EFFECTIVE TO RESIST FRACTURE UPON FLEXING

(75) Inventor: Arun K. Varshneya, Alfred, NY (US)

(73) Assignee: Saxon Glass Technologies, Inc., Alfred, NY (US)

( * ) Notice: Subject to any disclaimer, the term of this patent is extended or adjusted under 35 U.S.C. 154(b) by 506 days.

(21) Appl. No.: 11/468,470

(22) Filed: Aug. 30, 2006

(65) Prior Publication Data

US 2007/0060465 A1   Mar. 15, 2007

Related U.S. Application Data

(63) Continuation of application No. 11/382,567, filed on May 10, 2006, now abandoned.

(60) Provisional application No. 60/716,209, filed on Sep. 12, 2005.

(51) Int. Cl.
*B32B 17/00* (2006.01)
*C03C 3/083* (2006.01)

(52) U.S. Cl. ............... 428/410; 501/68; 501/69

(58) Field of Classification Search .............. 428/426, 428/410; 501/68, 69
See application file for complete search history.

(56) References Cited

U.S. PATENT DOCUMENTS

| | | | |
|---|---|---|---|
| 3,357,876 | A | 12/1967 | Rinehart |
| 3,410,673 | A | 11/1968 | Marusak |
| 3,433,611 | A | 3/1969 | Saunders et al. |
| 3,752,729 | A | 8/1973 | Mochel |
| 3,790,430 | A | 2/1974 | Mochel |
| 4,074,993 | A | 2/1978 | Ackerman et al. |
| 4,119,760 | A | 10/1978 | Rinehart |
| 4,156,755 | A | 5/1979 | Rinehart |
| 5,928,793 | A | 7/1999 | Kimura |
| 6,516,634 | B1 | 2/2003 | Green et al. |
| 6,668,587 | B2 | 12/2003 | Fujimura et al. |
| 6,814,453 | B2 | 11/2004 | Miwa et al. |
| 2005/0090377 | A1 | 4/2005 | Shelestak et al. |
| 2005/0250639 | A1 | 11/2005 | Siebers et al. |

FOREIGN PATENT DOCUMENTS

| | | |
|---|---|---|
| JP | 3-052130 | 3/1991 |
| JP | 7-134823 | 5/1995 |
| JP | 8-124153 | 5/1996 |

OTHER PUBLICATIONS

ASTM Designation: C 158, "Standard test methods for strength of glass by flexure (determination of modulus of rupture)", pp. 20-27.
ASTM Designation: C 1422, "Standard specification for chemically strengthened flat glass", pp. 432-434.
H.M. Garfinkel et al., "Ion concentration and stress in a chemically tempered glass", Journal of the American Ceramic Society, vol. 53, No. 12, pp. 686-691.

Martin E. Nordberg et al., "Strengthening by ion exchange", Journal of the American Ceramic Society, vol. 47, No. 5, pp. 215-219.
ASTM Designation: C 1048, "Standard specification for heat-treated flat glass-kind HS, kind FT coated and uncoated glass", pp. 356-362.
Malcolm D. Ingram et al., "Origins of anomalous mixed-alkali effects in ion-exchanged glasses", Glastech. Ber. Glass Sci. Technol. 73 (2000) No. 4, pp. 89-104.
Vineet Tyagi et al., "Measurement of progressive stress buildup during ion exchange in alkali aluminosilicate glass", Re-printed from Journal of Non-Crystalline Solids 238 (1998) 186-192.
ASTM Designation: F 394 (Reapproved 1996), "Standard test method for biaxial flexure strength (modulus of rupture) of ceramic substrates", pp. 496-500.
Arun K. Varshneya, "14.8: Some aspects of Diffusion and Conduction Phenomena", Fundamentals of Inorganic Glasses, pp. 339-345.
Arun K. Varshneya, "18.12: Strengthening and Toughening", Fundamentals of Inorganic Glasses, pp. 444-449.
D.R. Uhlmann et al., "Chapter 6: Chemical Strengthening of Glass", Glass: Science and Technology, vol. 5 "Elasticity and Strength in Glasses", pp. 217-270.
ASTM Designation: C 336, "Standard test method for annealing point and strain point of glass by fiber elongation", pp. 96-100.

(Continued)

*Primary Examiner* — Karl Group
(74) *Attorney, Agent, or Firm* — DOBE Law Group, LLC; Patrick R. Delaney

(57) ABSTRACT

Chemically strengthened lithium aluminosilicate glass is characterized by a surface compression of at least 100,000 psi and a compression case depth of at least 600 microns. The glass also may be characterized by a compression at 50 microns below a surface of the glass that is at least 30,000 psi. A method of making this glass includes providing a lithium aluminosilicate glass having a composition comprising (in weight %): $Li_2O$ in an amount ranging from 3 to 9%, $Na_2O+K_2O$ in an amount not greater than 3%, and $Al_2O_3$ in an amount ranging from 7 to 30%. The composition provides the glass with an annealing point temperature of at least 580° C. A mixed potassium and sodium salt bath is provided comprising predominantly potassium salt. A ratio of moles of sodium salt to moles of potassium salt in the mixed salt bath can range from 1:10 to 1:2. The temperature of the salt bath is maintained in a range of 450° C. up to an annealing point temperature of the glass. The glass is immersed in the salt bath for a period ranging from 2 to 96 hours. The inventive strengthened glass has high strength effective to resist fracture upon flexing and includes: bullet-resistant glass, blast-resistant glass, glass for armored defense vehicles, windows for government buildings, windows for monuments, windows for vehicles, train transparencies, aircraft transparencies, hurricane-resistant windows, earthquake-resistant windows, bank teller windows, display cases, and ATM touch panels.

17 Claims, 4 Drawing Sheets

OTHER PUBLICATIONS

Schott Robax Biaxial Flexure Strength vs. Ion Exchange Time, Sandia National Laboratories.

Testing application standard (TAS) 201-94, "Impact test procedures", printed from http://infosolutions.com, 7 pages.

Testing application standard (TAS) 202-94, "Criteria for testing impact & nonimpact resistant building envelope components using uniform static air pressure", printed from http://infosolutions.com, 7 pages.

Testing application standard (TAS) 203-94, "Criteria for testing products subject to cyclic wind pressure loading", printed from http://infosolutions.com, 6 pages.

_US 8,304,078 B2_

CHEMICALLY STRENGTHENED LITHIUM ALUMINOSILICATE GLASS HAVING HIGH STRENGTH EFFECTIVE TO RESIST FRACTURE UPON FLEXING

CROSS-REFERENCE TO RELATED APPLICATION

This application is a continuation of U.S. patent Ser. No. 11/382,567 filed May 10, 2006, now abandoned, which is a non-provisional application of U.S. Provisional Patent Ser. No. 60/716,209 filed Sep. 12, 2005, both of which are incorporated herein by reference in their entirety, and claims the benefit of U.S. Provisional Patent Ser. No. 60/716,209 filed Sep. 12, 2005.

FIELD OF THE INVENTION

The present invention relates to the field of chemically strengthened lithium aluminosilicate glass.

BACKGROUND

Glasses generally break because tension acting on a surface flaw exceeds the engineering strength of the glass. Thus, glass products can be effectively strengthened if compression is introduced into the surface. The strengthening depends to a great extent on the flaw condition of the glass, which, in turn, depends upon how the glass has been handled through product manufacturing as well as subsequent user-handling stages. One practical means of glass strengthening is to immerse the product in a bath of molten alkali salt at a temperature well below the transition temperature of the glass. Recommended molten salt is potassium nitrate for a sodium ion-containing glass and sodium nitrate for a lithium ion-containing glass. The basic principle is to use salt bath alkali ions that are larger than those in the glass. An ion exchange between the salt alkali ions and the glass host alkali ions results in surface stuffing of ions. This may relax due to viscous flow if the ion exchange temperature is raised close to or beyond the glass transition range. The glass transition temperature, often denoted $T_g$ in the literature, is also used in place of the annealing point temperature for which the viscosity of glass is stated to be $10^{13}$ Poise. According to the American Society for Testing Materials ("ASTM")_C-336, stresses relax in a matter of minutes at the annealing point. A lower temperature standard viscosity reference point is the strain point at which the viscosity is $10^{14.5}$ Poise. According to ASTM, stresses relax in a matter of hours at the strain point. These "chemical strengthening of glass" concepts in relation to the viscosity of glass are described in the literature, for instance in U.S. Pat. Nos. 3,752,729 and 3,790,430, both by Mochel and assigned to Corning Glass Works (now Corning, Inc.). See also R. F. Bartholomew and H. M. Garfinkel, in _Glass Science & Technology_, editors D. R. Uhlmann and N. J. Kreidl, vol. 5, p. 217-270, Academic Press 1980; and A. K. Varshneya, _Fundamentals of Inorganic Glasses_, 1$^{st}$ edition, pages 339-344 and 445-448, Academic Press 1994.

As a test for glass strength, the ASTM recommends performing a modulus of rupture ("MOR") test, see ASTM standard C158-84. One way to perform the MOR test is to load rectangular or circular cross-sectional beams in a 3-point or 4 point-mode. The rectangular beam tests, in particular, tend to be edge condition-dependent and, hence, flaws on the sawed/ground edge are invariably the origin of the fracture. The MOR test is desensitized to edge conditions by performing concentric "ball-on-ring" or "ring-on-ring" (also called "concentric ring") tests; see ASTM F-394.

Because the handling flaws are generally of the order of 10 to 50 microns, the performance of chemically strengthened glass products depends not only on the magnitude of the surface compression introduced but also on the "case depth," which is the depth of the compression below the surface (depth at which the decreasing compression magnitude essentially reaches zero stress, changing over to a tension at larger depths). The ASTM standard C1422-99 thus classifies chemically strengthened flat glass products based on (i) the magnitude of surface compression and (ii) the magnitude of case depth. For protection against impacting projectiles, both should be as large as possible. Unfortunately, the ion exchange process, being atomic diffusion dependent, is extremely sluggish. Invading ion penetration only increases as the square root of time. It is also known, however, that the depth of surface compression does not increase as the square root of time. This is because, with time, some atomic adjustments occur to relieve the beneficial compression even at temperatures well below the strain point (see V. Tyagi and A. K. Varshneya, _J. Non-Cryst. Sol._ 238, p. 186-192 (1998); and M. D. Ingram et. al. _Glastech. Ber. Glass Sci. & Technol._ 73(4) 89-104 (2000)). Thus, while minutes of immersion in a molten salt bath could be conducted at temperatures just below the strain point to avoid the relaxation of the beneficial surface compression, an ion exchange process requires hours or days of immersion to develop a sufficient case depth at temperatures well below the strain point of the glass.

For a given glass composition, the overall strengthening is a function of the type of invading ion (salt bath composition), bath temperature and immersion time. The need for proper ion exchange temperature and immersion time is demonstrated well for the chemical strengthening of a sodium aluminosilicate glass in a classic publication by Nordberg et. al. _J. Am. Ceram. Soc._, vol. 47(5) p. 215-219 (1964) of which FIG. 9 is included herewith as FIG. 1 below for reference. Note that if "fast exchange" with good MOR were the intent, an optimized exchange would be 550° C. for 1 hour. However, if maximum MOR were the intent, for instance to fend against more severe handling, the ion exchange treatment would be at 450° C. continuing beyond 16 hours.

One commercially successful example of ion exchange-strengthened glass is aircraft windshield manufactured in the USA by PPG, Incorporated. With roughly 400 MPa (about 58,000 psi) of surface compression and a case depth of about 300 microns, such glass, when assembled as a multilayer laminate with polymers such as polyvinyl butyrate and polycarbonate, is designed to protect the aircraft from flying birds. In a quality control test such windshields exhibited full containment after impacting a 4-Lb standardized thawed chicken (or equivalently 4-Lb gel mass) flying from a gas-pressurized cannon at 400 knots. Several other applications of chemically strengthened glass do exist, such as for optical storage disk media, ophthalmic glass, and pharmaceutical containers, where the requirements of the compression magnitude and case depth are not so severe.

Aircraft windshield is a typical example of a high security application for multilayered glass and polymer laminate. The laminates are constructed to be thick enough such that the outboard plies of a tough polymer act to absorb the energy of an impacting projectile and the glass plies provide the resistance to flexure due to their high elastic moduli. After most of the energy of the projectile is absorbed by the "sacrificial" outer plies, the inboard plies of glass prevent the penetration due to their high resistance to fracture. One other function of the polymer interlayer is to retain fractured pieces of glass adhered to it instead of flying away as shards that otherwise could cause serious injury. The thickness of the composite not only provides energy absorption but also reduced flexure which, in turn, results in lesser tension on the convexed surface, hence, lesser probability of glass fracture. Unfortunately, the higher thicknesses of such composites can add greatly to the overall weight of the assembly which, in turn, may be detrimental to the performance of, say, a vehicle equipped with such glass laminate. The use of extremely high strength glass plies inboard reduces the need for high glass ply thickness, hence, forms a significantly superior design.

For architectural window applications that meet Florida Building Code, otherwise called the "hurricane code" (www.dca.state.fl.us/fhcd/fvc; Test Application Standards TAS 201, 202, and 203), glasses are often only heat-strengthened or fully tempered ("Kind-HS" or "Kind-FT" of ASTM C1048-97b) and laminated. The thermal tempering process, which takes only a few minutes to introduce surface compression, creates a case depth from each side that is roughly $\frac{1}{5}^{th}$ of the glass thickness, thus about 1.2 mm deep for an approximately 6 mm thick conventional glass window. Unfortunately, the thermally tempered glasses are limited to achieving no more than about 100 MPa surface compression, which is rarely adequate for protection against high velocity flying debris in a Category 4 or stronger hurricane. Further, because the thermal tempering process necessarily raises the temperature of the glass to well above the glass transition temperature during the manufacturing process, some optical distortion of the glass due to viscous flow is unavoidable. Use of such windows in critical applications such as military armored vehicles, hence, is not recommended. Additionally, the high weight of glass windows in buildings designed to withstand hurricanes could present structural limitations.

In the practice of chemical strengthening of glass, it is well known that the soda-lime-silicate glasses, which generally form the basis of most architectural and windshield applications, can only be strengthened to a depth of a few microns using immersion in potassium nitrate bath. Use of higher temperatures relaxes the beneficial compression and the use of lower bath temperatures requires days of immersion substantially increasing the costs of manufacturing. A publication by Nordberg et. al. from Corning Glass Works (J. Amer. Ceram. Soc., vol. 47, p. 216-219, 1964) discusses the strengthening of a 9 mol % lithium oxide-containing aluminosilicate glass immersed in a molten sodium nitrate salt bath at about 400° C. for 4 hours. With alumina increasing from 14 to 40%, tumble-abraded strengths increased from about 35 Kpsi (1000 psi) to as much as 100 Kpsi. Case depths obtained were 0.010 inch (about 250 microns) to 0.020 inch (about 500 microns).

Garfinkel and King (J. Amer. Ceram. Soc., vol 53, p. 686, 1970) disclose strengthening a 5.15 wt % lithium oxide-containing aluminosilicate glass immersed in sodium nitrate salt bath at 404° C. for 4 hours to achieve a case depth of about 210 microns and an MOR of about 97 Kpsi. U.S. Pat. No. 3,790,430 by Mochel describes the chemical strengthening of an 18 mol % lithium oxide-containing aluminosilicate glass immersed in a molten sodium nitrate salt bath at about 400° C. for 4 hours. Strengths of 106,000 psi were claimed to have been achieved. However, no measurements of case depth were reported.

The strengthening of sodium aluminosilicate glasses by immersion in potassium nitrate salt bath is described in U.S. Pat. No. 4,119,760 by Rinehart and assigned to Pittsburgh Plate Glass Company, now PPG, Incorporated. The compositions are claimed to have been suitable for forming using the conventional "updraw" or "float" processes for making flat glasses. Short term exchange such as 900° F. (482° C.) and 4 hours in a potassium nitrate bath was said to produce MOR levels of about 90 Kpsi with a case depth of only 50 microns. The MOR degraded rapidly to 49 Kpsi (Table IV) as the exchange temperature was increased to 1050° F. (565° C.) for times as little as ½ hour.

It is known that achieving a case depth of the order of 150 microns or more requires lithium to sodium ion exchange (lithium ions in the glass exchanged by sodium ions in a molten salt bath in which the glass is immersed). Therefore, for strengthening lithium-containing glass, the conventional salt bath contains almost all sodium salt, such as sodium nitrate. U.S. Pat. No. 3,357,876 by Rinehart and assigned to Pittsburgh Plate Glass Company, discusses strengthening lithia-soda-alumina-phosphorus pentoxide-silica glasses containing 1 to 25 wt % phosphorus pentoxide, by immersion in salt baths containing sodium nitrate or potassium nitrate and in serially conducted exchange experiments where each successive treatment is conducted using an alkali metal which is larger in ionic size than that employed in the prior experiment. This patent disclosure requires phosphorus pentoxide ($P_2O_5$) and $Na_2O$ in the base glass.

U.S. Pat. No. 3,433,611 by Saunders et al. and assigned to PPG Industries, Inc., also describes chemically strengthening lithia-soda-aluminosilicate glass that includes phosphorus pentoxide. This patent discloses using a mixed salt bath having a ratio of potassium nitrate salt to sodium nitrate salt in a range of 2:1 to 50:1. The patent discloses that the stress profiles of the lithia-soda-alumina-phosphorus pentoxide-silica glasses obtained by immersion in an 8:1 potassium nitrate to sodium nitrate bath at 875° F. (468° C.) for 60 minutes show surface compression of about 96 Kpsi dropping steeply to about 35,000 at a depth of 20 microns and subsequently falling to zero around 220 microns depth (Example 11, paragraph 6; FIG. 3).

U.S. Pat. No. 3,410,673 by Marusak and assigned to Corning Glass Works (now Corning Inc.) discloses a method of chemically strengthening lithium aluminosilicate glass containing lithium and sodium ions. The glass may be subjected to immersion in multiple salt baths, for example, immersion in a bath of sodium salt, followed by immersion in a potassium salt bath. The purpose indicated is to first exchange lithium in the glass by sodium from the bath and, subsequently, lithium and/or sodium ions in the surface of glass by potassium ions from the bath. The patent also discloses using a salt bath comprising a 50:50 mixture of sodium and potassium salt to strengthen a glass which originally contained both lithium and sodium.

To the inventors' knowledge none of the above-mentioned glasses or processes described in numerous patents has been commercially utilized in the application of resisting fracture upon impact of high velocity projectiles (e.g., bullets or high wind velocity hurricanes). We have observed that a primary difficulty in some of the glass compositions is the presence of large amounts of phosphorus pentoxide which, due to its extreme tendency for volatilization during typical glassmelting processes such as those needed in float glass or sheet updraw production, is not a desirable constituent. U.S. Pat. No. 4,156,755 by Rinehart and assigned to PPG Industries, Inc. discloses glasses having 59-63% $SiO_2$, 10-13% $Na_2O$, 4-5.5% $Li_2O$, 15-23% $Al_2O_3$ and 2 to 5% $ZrO_2$. Rinehart's glass composition avoided using $B_2O_3$ and $P_2O_5$ in view of their volatility but employed a high amount of $Na_2O$. In addition, Rinehart chemically strengthened the glass by immersion in pure sodium nitrate bath at 705° F. for 22 hours (or 750° F. for 4 hours). An MOR of about 45 kpsi with a case depth of about 190 microns were reported.

We recognize that, whereas about 400 MPa surface compression and about 300 micron case depth in 2-3 sheets of laminated glass are adequate for aircraft windshields, these values are inadequate for providing resistance of a glass transparency against bullets or flying debris from high wind velocity hurricanes. Both the magnitude of surface compression as well as the case depth need to be increased for glass products under such extreme conditions. The problem lies in the facts that, in case of potassium exchange for sodium in sodium-containing glasses, although the surface compression generated is large, the case depth developed is generally less than 100 microns. As shown above, potassium ions from a potassium-containing salt bath exchanging for lithium ions in glass is even slower. Efforts to increase the case depth by increasing the temperature to effect a faster exchange or time to increase invading ion penetration, generally result in relaxation of the beneficial surface compression.

A published U.S. patent application 20050090377 by Shelestak et al., assigned to PPG Industries Inc. discloses using high strain point lithium aluminosilicate glasses and a sodium salt bath or predominantly sodium, mixed Na/K salt bath, in an attempt to achieve deeper surface compression and higher MOR. The authors disclose lithium aluminosilicate glasses having a composition comprising (in weight %): $Li_2O$ in a range of 3 to 9%, $Na_2O+K_2O$ in an amount of less than 3.5% and $Al_2O_3$ in an amount ranging from 7% to 30%. The molten salt bath disclosed in the '377 patent application preferably uses at least 50% sodium salt (generally sodium nitrate) and, in particular 100% sodium salt, to enable sodium exchange. This reference discloses case depths of, for example, 11.5 to 17.4 mils (about 300 to 450 microns).

In addition, Sandia National Laboratories have proposed strengthening a high annealing point lithium aluminosilicate glass (Schott ROBAX® glass composition) using a pure potassium nitrate salt bath (see S. Jill Glass et al., paper no. GOMD-S2-29-2004, American Ceramic Society, Glass & Optical Materials Div. meeting, Cocoa Beach Fla., Nov. 7-12, 2004). This purportedly produced, for example, high surface compression of 850 MPa, but low case depths of only 40 microns that took days of immersion to achieve (shown in Table 1 below in the column for Schott).

Similarly, U.S. Pat. No. 6,814,453 by Miwa and Kanai and assigned to Nippon Electric Glass Co. Ltd. describes strengthening high annealing point lithium aluminosilicate glass in a bath of potassium nitrate at 500° C. for about 6 hours to develop a strengthened substrate to prevent projector lamp fragments from flying forward after sudden failure. The depth of compression stated is only about 20 to 30 microns. The Miwa et. al. patent essentially confirms the results of Sandia National Laboratories, that exchange of lithium ion in glass for potassium ion from a salt bath is a very slow process.

Despite all of the work in the area of chemical strengthening of glass, a need remains for a glass having high strength to resist fracture upon flexing from impact of high velocity projectiles. Such a glass will need to be formable by commercially available glassforming processes with a temperature-time schedule that enables efficient and cost-effective chemical strengthening.

Many additional features, advantages and a fuller understanding of the invention will be had from the accompanying drawings and the Disclosure of the Invention that follows. Specific embodiments, figures and examples in the Disclosure of the Invention should not be construed as necessary limitations of the broad invention as defined in the claims.

DISCLOSURE OF THE INVENTION

Figure 1:
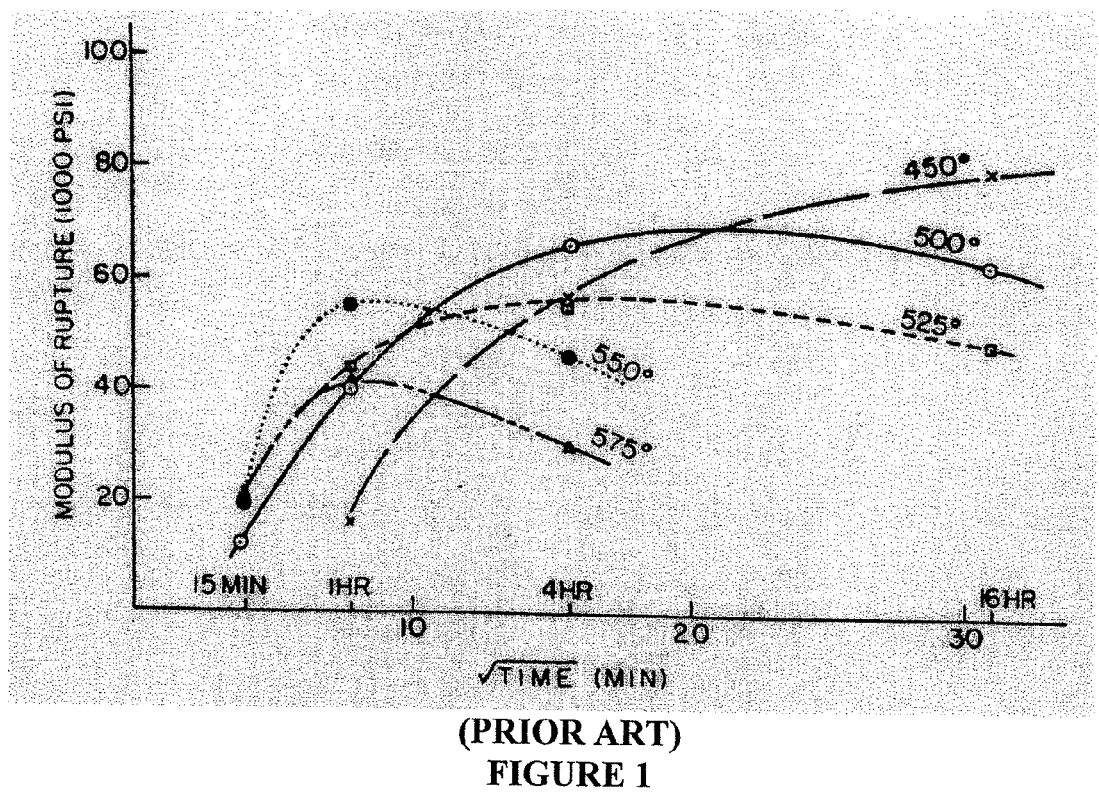
FIG. 1 shows modulus of rupture (MOR) of a chemically strengthened glass as a function of ion exchange treatment and time. The figure shows stress relaxation at higher temperatures or longer times, in turn, suggesting that a need to optimize the ion exchange schedule exists. Taken from Nordberg et al.

The present invention features chemically strengthened lithium aluminosilicate glass of a composition that provides the glass with a high strain point, which achieves unexpectedly high surface compression, deep compression case depth and high strength effective to resist fracture upon flexing from impact of high velocity projectiles. The inventive glass is characterized by a surface compression of at least 100,000 psi and a compression case depth of at least 600 microns and, in particular, of at least 1000 microns. In particular, the glass can exhibit a strength at 50 microns below a surface of the glass that is at least 30,000 psi. The compression level is 30,000 psi, hence, a tensile stress higher than 30,000 psi would be needed to cause fracture.

As defined herein, the term "annealing point" is the temperature at which stresses in a glass at a viscosity of $10^{13}$ poise are relieved in 15 minutes. The term "case depth" is defined herein as a distance measured from a surface of a glass article to a position in the interior of the article at which there is zero stress in the glass article. The surface of the glass can be any surface that is exposed to the molten salts of the ion exchange bath.

The present invention uses a molten salt bath having a balanced mix such that both exchanges (sodium for lithium deep inside the glass and potassium for lithium in the surface) occur concurrently. In conventional salt baths having high sodium salt concentration, there is little potassium-lithium exchange. The inventors have recognized the advantage of using elevated temperature of the bath of 450° C. and higher to increase the mobility of potassium ions, which requires the glass to have a sufficiently high annealing point such that viscous relaxation of stresses does not occur significantly. The inventors have further recognized the need for high amounts of potassium in the mixed bath to encourage potassium for lithium exchange in the surface. This results in glass having high strength adapted for use under the extreme condition of resisting fracture upon flexing from impact of high velocity projectiles.

The present invention can strengthen commercially available flat glass. Glass that may be chemically strengthened according to the present invention has a composition comprising (in weight %): $Li_2O$ in an amount ranging from 3 to 9%, $Na_2O+K_2O$ in an amount less than about 3.5%, and $Al_2O_3$ in an amount ranging from 7 to 30%. In particular, $Na_2O+K_2O$ in the glass ranges from 0 to 3%, and $Al_2O_3$ ranges from 18-28%. More specifically, the inventive glass has a composition consisting essentially of: $Li_2O$ in an amount ranging from 3 to 9%, $Na_2O+K_2O$ in an amount less than about 3.5%, $Al_2O_3$ in an amount ranging from 7 to 30%, up to about 4% each of $ZrO_2$, $TiO_2$ MgO, ZnO and other similar constituents totaling no more than 10%, with the balance being $SiO_2$ and unavoidable impurities. The inventive composition does not add $B_2O_3$ or $P_2O_5$ and these compounds are not present in amounts greater than 0.05 wt % or other than what is considered an impurity or tramp ingredient. Additional compositions of glasses that may be suitable for strengthening in accordance with the present invention are those disclosed in published U.S. patent application 20050090377 by Shelestak et al., incorporated herein by reference, which have an annealing point of at least 580° C.

Exemplary glass that is suitable for being strengthened in the method of the present invention is a pre-cerammed glass manufactured by Nippon Electric Glass (NEG) of Japan. This glass (shown in column 2) and other suitable glasses have the compositions shown in Table 1 below, and may be treated by the salt bath temperatures and immersion times shown in Table 1. The Treatments indicated in Table 1 specify the type of salt bath, and temperature, time of immersion of the glass therein. The Properties reported in Table 1 specify the case depth and surface compression of the glass, respectively.

surement of stress at 50 microns, those familiar with the chemical strengthening process recognize that superior resistance to fracture is afforded where the compression continues to be significantly large at distances representing the length of flaws typical of handling, and in extreme cases, at the base of craters produced by an impacting projectile. Handling flaws are mostly 50 microns deep, less in a commercial setting where the glass is laminated with polymer before getting scratched.

Glass that is suitable for being treated to effect high strength and deep compression case depths according to the present invention has a composition that provides it with an annealing point of 580° C. or higher. This allows chemical strengthening to be carried out using a molten mixed salt bath having a temperature of 450° C. or higher and, in particular, 475° C. or higher. Although the glass can be preheated, neither the salt bath temperature nor the glass temperature should be close to the glass annealing point temperature or exceed a temperature that is about 25° C. less than the glass annealing point temperature. The lithium aluminosilicate glass has a high transition temperature (Tg) of, for example, about 620-630° C.

The present invention advantageously uses a high concentration of potassium salt in the dual salt bath. A ratio of moles of sodium salt to moles of potassium salt in the salt bath ranges from 1:10 to 1:2 and, in particular, is about 1:4. The amount of sodium salt in the total salt of the molten mixed salt bath is well below 50 mol %. The composition of the salt bath comprises sodium salt in an amount ranging from 10 mol % to 40 mol %, with the balance being potassium salt and unavoidable impurities. In particular, the salt bath has a composition consisting essentially of sodium salt in an amount ranging

TABLE 1

| Glass Composition (weight %) | PRIOR ART Schott ROBAX ® | | INVENTION NEG | INVENTION NEG |
|---|---|---|---|---|
| $SiO_2$ | 67.2 | | 65.7 | 65.1 |
| $Al_2O_3$ | 20.1 | | 22 | 22.6 |
| $Li_2O$ | 3.2 | | 4.5 | 4.2 |
| MgO | 1.1 | | 0.5 | 0.5 |
| CaO | 0.05 | | | |
| BaO | 0.9 | | | |
| ZnO | 1.7 | | | |
| $Na_2O$ | 0.4 | | 0.5 | 0.6 |
| $K_2O$ | 0.23 | | 0.3 | 0.3 |
| $B_2O_3$ | | | | |
| $TiO_2$ | 2.7 | | 2 | 2 |
| $ZrO_2$ | 1.7 | | 2.5 | 2.9 |
| F | | | | 0.1 |
| Treatment: | Potassium 500° C. 8 days | Potassium 500° C. 2 days | Potassium and Sodium 450° C.-475° C. 8 hours | Potassium and Sodium 450° C.-475° C. 1 day |
| Properties: | 80 μm 550 MPa | 40 μm 850 MPa | 600 μm 1000 MPa | 1000 μm 800 MPa |

Other glasses that may be suitable for being strengthened by the method of the present invention are ROBAX® glass by Schott Inc. having the composition shown in Table 1 (but using the inventive mixed salt bath, temperature and period of immersion) and HERCUVIT® pre-cerammed glass by PPG, Inc.

We measure surface compression and case depth herein by the procedure prescribed by ASTM C1422-99. We measure modulus of rupture (MOR) herein by closely following ASTM standard F-394, "Biaxial Flexural Strength (MOR) of Ceramic Substrates" also known as the "ball-on-ring" procedure, which was, otherwise, prescribed for ceramic substrates. Although standard C1422-99 does not prescribe meafrom 20 mol % to 40 mol %, with the balance being potassium salt, unavoidable impurities and optional scavengers therefor. An exemplary composition of the salt bath that is advantageously used in the present invention is about 20 mol % sodium salt, about 80 mol % potassium salt and unavoidable impurities.

One way of preparing the salt bath is to weigh the salts dry in the indicated amounts, mix the salts, place the salts in the vessel that will contain the bath and turn on the electricity to the bath to melt the salt mixture and heat the bath to the specified temperature. The molten salt bath contains molten salt and no other solvents. The salt bath has no water, besides trace amounts of structure bound water. The composition of the salt bath is maintained over time, such as by periodically changing out the salt. The salts in the salt bath can be sodium nitrate and potassium nitrate. Other salts of sodium and potassium may be used instead of nitrate salts. That is, other anions such as chlorides, sulfates, phosphates and the like can be used instead of nitrates, and may be preferred when bath temperatures are high in order to reduce salt volatilization.

Unavoidable impurities build up in the molten salt bath over time. As a result of the continuing exit of lithium and other ions contained in the parent glass structure from the glass, the ions build up in the bath. The amount of lithium oxide in the bath is maintained below 1 mol %, preferably below 0.1 mol %. Depending upon the chemical composition of the parent glass used, other potential impurities include aluminum, boron, calcium, magnesium, barium, zinc, titanium and zirconium. Potential impurities from the steel of the vessel that contains the bath include iron, chromium and nickel. Initially, "scavengers" or "getters" such as sodium and potassium silicate powders or flakes are used to absorb some of the impurities. After some time, the scavenging effect is reduced and the bath is dumped and replaced with uncontaminated salt. The salts have varying impurities that should be minimized as much as commercially possible. Salts of extremely high purity may be most advantageous in the present invention. Commercially obtained salt may need to be purified to a suitable level determined by one skilled in the art in view of this disclosure, such as by scavenging, before the bath is used. The scavengers are left in the bath, or the bath can first be treated by a bag containing the scavengers and the bag is subsequently removed.

With the concurrent exchange of potassium and sodium ions in the bath for the lithium ions in the glass at elevated temperatures without significant viscous relaxation of the glass, high surface compression of 690 MPa to 1000 MPa (100,000 to 145,000 psi) and a deep compression case depth on the order of up to a millimeter in as little as 1 day of immersion in the salt bath, is achieved by the invention. The resulting glass has very high strength (modulus of rupture approaching 1 GPa or 145 Kpsi).

The present invention advantageously enables high speed strengthening. Compared to conventional immersion lasting often 10 days, maybe more, the invention can achieve very high strength in as little as 4 hours of immersion and very high strength such as for security glass (bullet-resistant applications) in as little as a day of immersion. Refer to Table 1 above for exemplary durations of immersion and resulting surface compression and case depth for the glass compositions provided.

The invention features a chemically strengthened glass with greater than 100,000 psi (about 690 MPa) surface compression and in particular, not less than 30,000 psi compression at 50 micron depth from the surface and a total case depth of at least 600 microns (about 24 mils).

Figure 2:
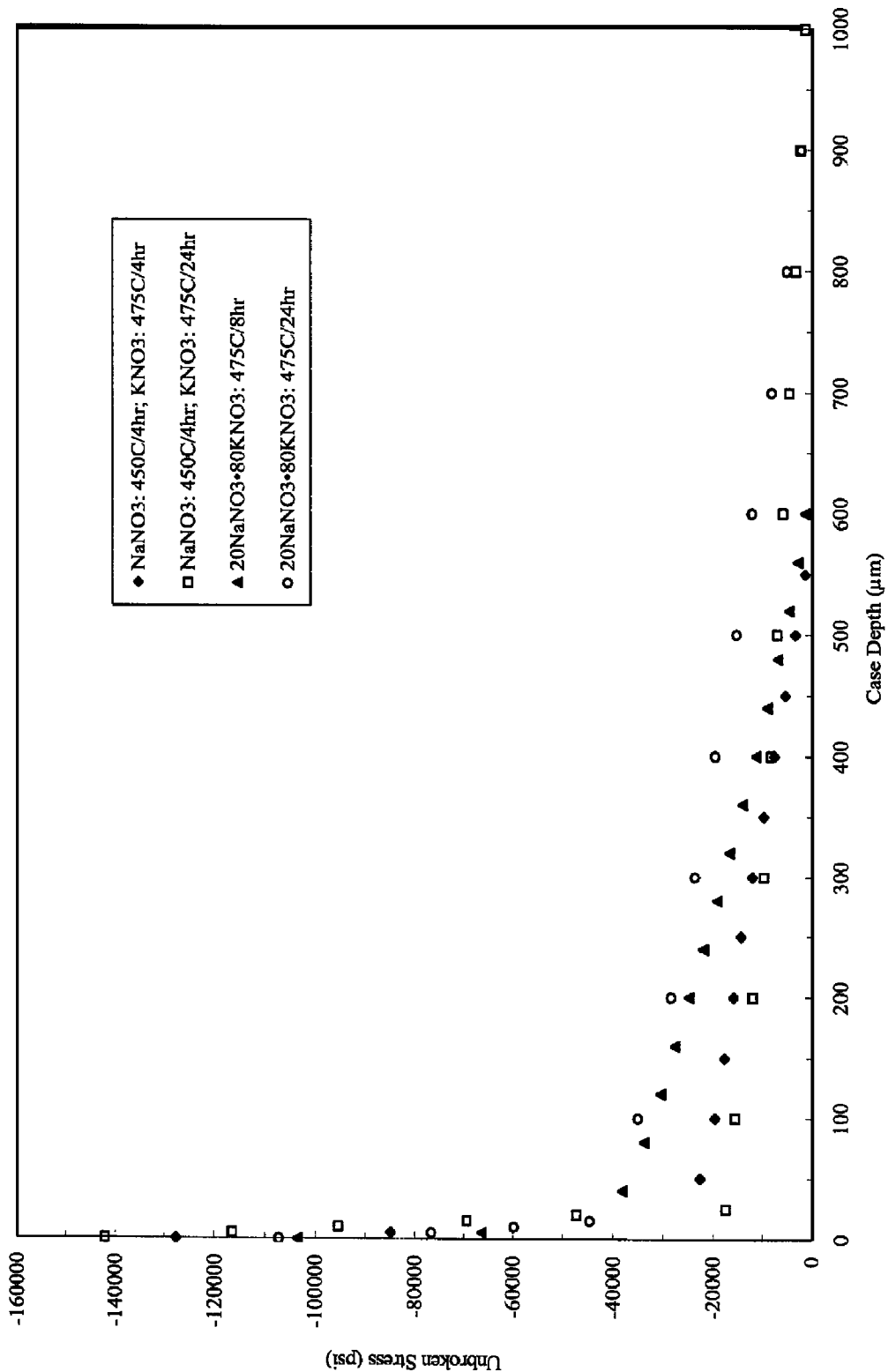
FIG. 2 shows compressive stress profiles in an unbroken plate of the inventive aluminosilicate glass as a function of ion exchange treatment for various salt baths wherein circle and triangle datapoints correspond to use of the indicated mixed sodium and potassium salt bath used in the invention whereas the diamond and square comparative datapoints correspond to use of a sodium salt bath followed by a potassium salt bath.

FIG. 2 shows a stress profile plot for 4 specimens of the NEG's column 2 "mother" glass (see Table 1) prior to ceramming. The square and diamond comparative datapoints are for sequential exchange at 450° C. first with $NaNO_3$ and then at 475° C. with $KNO_3$. This sequential exchange is not part of the present invention. The circle and triangle datapoints are for concurrent sodium and potassium salt exchange at 475° C. that embody our invention.

Figure 3:
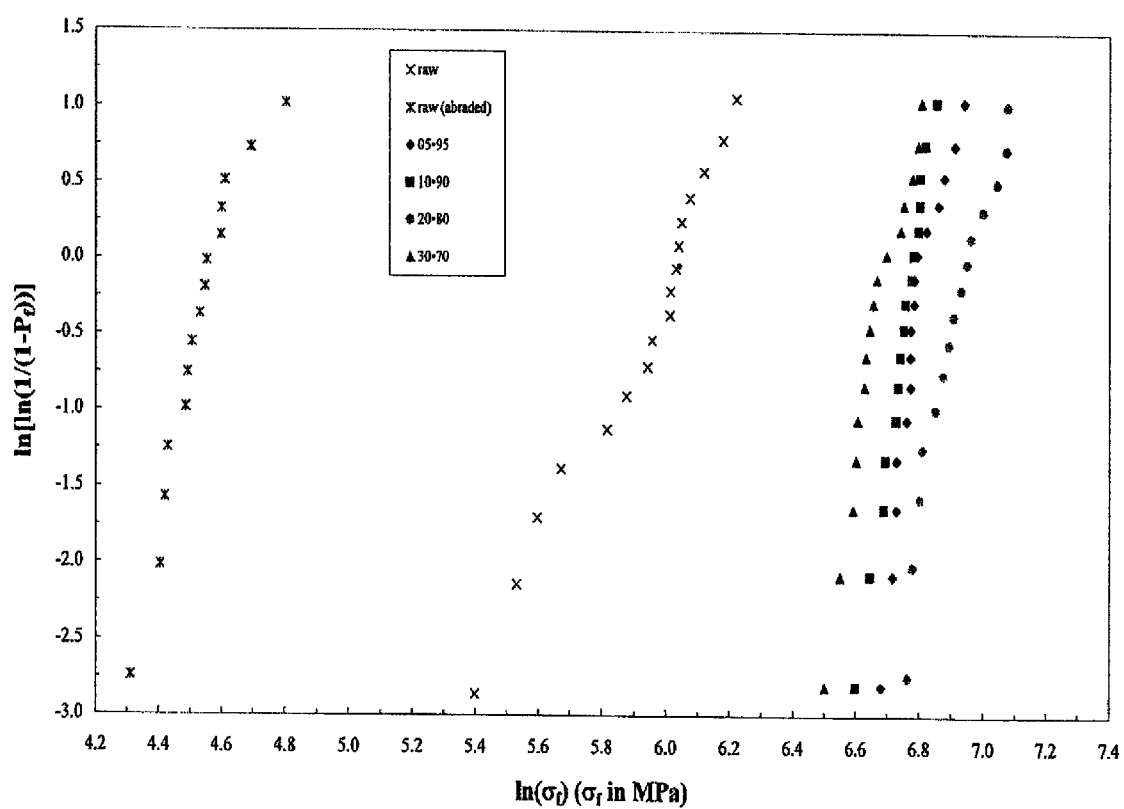
FIG. 3 shows Weibull plots of the strengths of the inventive lithium aluminosilicate silicate glass as a function of ion exchange at 475° C. for 24 hours in a sodium nitrate and potassium nitrate mixed salt bath. The inset shows the molar ratio of sodium to potassium in the mixed salt bath. Note $\sigma_f$=90 MPa; 148 MPa; 403 MPa; 735 MPa; 1096 MPa at ln $(\sigma_f)$=4.5; 5.0; 6.0; 6.5; and 7.0, respectively, wherein 1 MPa is about 145 psi; and cumulative probability of failure $P_f$=98.9%, 80.8%, 63.2%, 30.8%, 12.6% and 4.8% at ln [ln $\{1/(1-P_f)\}$]=1.5, 0.5, 0.0, −1.0, −2.0 and −3.0 respectively.

Shown in FIG. 3 are Weibull fracture probability plots for glass ion exchange-strengthened in mixtures of sodium nitrate ($NaNO_3$) and potassium nitrate ($KNO_3$) salts where the ratio of salt has been varied from 0 to 30 mol % (4.25 to 26.5 weight %) and compared with data obtained with unstrengthened and unstrengthened-plus-abraded specimens. The plots show the superiority of the 20 mol % sodium nitrate salt mixture over others. In addition, it can be seen, from steepness of the slope, that the chemically strengthened glasses have narrower strength distributions compared to the unstrengthened glass. For product specifications, one prefers glass strength distributions to be narrow. The slope of the curves yields Weibull modulus. Whereas the Weibull modulus values for the unstrengthened glasses were around 4.5, the strengthened glasses had Weibull modulus values ranging between 9 and 18.

Figure 4:
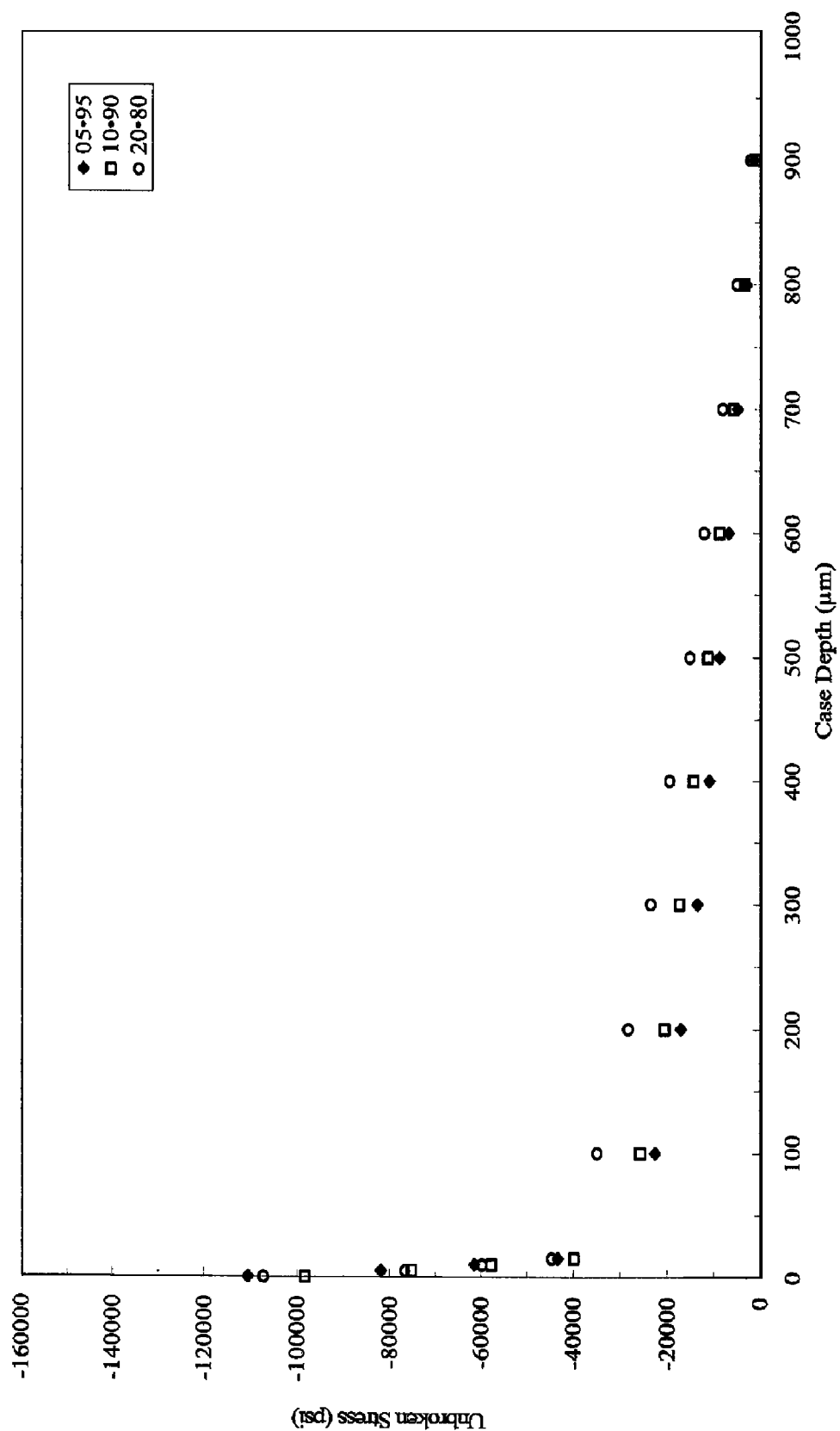
FIG. 4 shows compressive stress profiles in an unbroken plate of the inventive lithium aluminosilicate glass as a function of ion exchange treatment for various salt baths. The inset shows the molar ratio of sodium salt to potassium salt in the mixed salt bath.

FIG. 4 shows stress profiles for 5, 10 and 20 mol % sodium nitrate (balance potassium nitrate) baths. Again, the higher stresses achieved with ion exchange in the 20 mol % sodium nitrate bath are evident. NEG's column 2 "mother" glass shown in Table 1 was used for all specimens.

On the ASTM C-1422-99 standard, the surface compression and case depth for the glass treated according to the invention (circle and triangle data points shown in FIG. 2) correspond to a glass level 5F, which is an extreme high strength limit recognized to date. Those skilled in the art will appreciate in reading this disclosure that although ASTM C-1422-99 does not prescribe any details of the profile below the surface, glass treated according to the present invention may exhibit a maximum compression value that is not exactly on the surface. While not wanting to be bound by theory, such treated glass may advantageously possess a maximum compression value that is a few microns below the surface (disclosed in U.S. Pat. No. 6,516,634 by Green et al.). The strengthened glass of the present invention advantageously exhibits a relatively high compression value at about 50 microns below the surface compared to the Saunders patent publication.

Applications for the chemically strengthened glass produced in accordance with the present invention include: glass transparencies for high-security applications, such as, bullet and blast-resistant glass, glass for armored defense vehicles, windows for government buildings and monuments, private vehicles, train and aircraft transparencies, and hurricane and earthquake-resistant windows. Lower security need applications such as bank teller windows, display cases, and ATM touch panels may also benefit from our invention.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. Chemically strengthened lithium aluminosilicate glass having high strength effective to resist fracture upon flexing, the glass having a composition comprising:
   $SiO_2$ and $Al_2O_3$,
   wherein the glass is characterized by having a surface compression of at least about 100,000 psi and a compression case depth of at least about 600 microns,
   wherein the glass is formed by chemically strengthening an untreated glass having a composition including $Li_2O$ in an amount ranging from about 3 to 9 weight % and $Al_2O_3$ in an amount ranging from about 7 to 30 weight % and $SiO_2$, and an annealing point temperature of at least about 580° C. prior to chemical strengthening, and
   wherein the glass is formed by a method comprising immersion of the untreated glass in a mixed potassium and sodium salt bath, containing greater than about 50 mole % potassium salt and less than about 50 mole % sodium salt, at a temperature ranging from about 450° C. to below the annealing point temperature of the untreated glass.

2. The glass of claim 1, having a compression that is at least about 30,000 psi at about 50 microns below a surface of the glass.

3. The glass of claim 1, wherein the glass is characterized by having a compression case depth of at least about 1000 microns.

4. The glass of claim 1, wherein the glass is formed by a method comprising immersion of the untreated glass having a composition further comprising $Na_2O+K_2O$ in an amount less than about 3.5 weight %.

5. The glass of claim 4, wherein the $Na_2O+K_2O$ ranges from about 0 to 3 weight % and the $Al_2O_3$ ranges from about 18 to 28 weight %.

6. The glass of claim 4, wherein a ratio of moles of sodium salt to moles of potassium salt in the mixed sodium and potassium salt bath ranges from about 1:10 to about 1:2.

7. The glass of claim 6, wherein the ratio of moles of sodium salt to moles of potassium salt in the mixed sodium and potassium salt bath is about 1:4.

8. An article comprising the glass of claim 1, wherein the article is a member selected from the group consisting of: bullet-resistant glass, blast-resistant glass, glass for armored defense vehicles, windows for government buildings, windows for monuments, windows for vehicles, train transparencies, aircraft transparencies, hurricane-resistant windows, earthquake-resistant windows, bank teller windows, display cases, and ATM touch panels.

9. Chemically strengthened lithium aluminosilicate glass, the glass having a composition comprising:

$SiO_2$ and $Al_2O_3$, wherein the glass is characterized by having a surface compression of at least about 100,000 psi and a compression case depth of at least about 600 microns, wherein the glass is formed by chemically strengthening an untreated glass having a composition including $Li_2O$ in an amount ranging from about 3 to 9 weight % and $Al_2O_3$ in an amount ranging from about 7 to 30 weight % and $SiO_2$, the untreated glass having an annealing point temperature of at least about 580° C. prior to chemical strengthening, and wherein the glass is formed by a method comprising immersion of the untreated glass in a mixed potassium and sodium salt bath, containing less than 50 mole % sodium salt, at a temperature ranging from about 450° C. to below the annealing point temperature of the untreated glass.

10. The glass of claim 9 wherein the glass is characterized by having a compression case depth of at least about 1000 microns.

11. The glass of claim 1, wherein the untreated glass has a glass transition temperature of at least about 620° C. prior to chemical strengthening.

12. The glass of claim 1, wherein the untreated glass has a glass transition temperature of at least about 630° C. prior to chemical strengthening.

13. The glass of claim 9, wherein the glass is characterized by having a compression at about 50 microns below a surface of the glass that is at least about 30,000 psi.

14. The glass of claim 1, wherein the mixed potassium and sodium salt bath contains less than about 40 mole % sodium salt.

15. The glass of claim 1, wherein the mixed potassium and sodium salt bath contains less than about 33 mole % sodium salt.

16. The glass of claim 9, wherein the length of time is up to about 1 day.

17. The glass of claim 9, wherein the length of time is up to about 4 hours.

* * * * *